US010327215B2

(12) United States Patent
Zheng et al.

(10) Patent No.: US 10,327,215 B2
(45) Date of Patent: Jun. 18, 2019

(54) SYNCHRONIZATION CONTROL METHOD WITHIN WIRELESS NETWORK, WIRELESS NETWORK AND SMART HOME DEVICE

(71) Applicant: Telink Semiconductor (Shanghai) Co., LTD., Shanghai (CN)

(72) Inventors: Mingjian Zheng, Shanghai (CN); Haipeng Jin, Shanghai (CN)

(73) Assignee: Telink Semiconductor (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/853,406

(22) Filed: Dec. 22, 2017

(65) Prior Publication Data

US 2018/0124722 A1    May 3, 2018

Related U.S. Application Data

(63) Continuation of application No. 15/089,876, filed on Apr. 4, 2016, now Pat. No. 9,942,868.

(30) Foreign Application Priority Data

Oct. 19, 2015   (CN) .......................... 2015 1 0680951

(51) Int. Cl.
*H04W 4/38* (2018.01)
*H04L 12/28* (2006.01)
*H04L 12/64* (2006.01)
*H04W 56/00* (2009.01)

(52) U.S. Cl.
CPC ....... *H04W 56/002* (2013.01); *H04L 12/6418* (2013.01); *H04W 4/38* (2018.02); *H04W 56/001* (2013.01); *H04L 12/2803* (2013.01)

(58) Field of Classification Search
CPC ... H04W 56/002; H04W 4/38; H04W 56/001; H04L 12/6418
See application file for complete search history.

(56) References Cited

U.S. PATENT DOCUMENTS 9,686,094 B2    6/2017   Kim et al.

*Primary Examiner* — Mohammad S Anwar
(74) *Attorney, Agent, or Firm* — Greer Burns & Crain, Ltd.

(57) ABSTRACT

The present disclosure relates to the smart home field, disclosing a synchronization control method within wireless network, a wireless network and a smart home device. In the present disclosure, controlling a terminal to broadcast a control command directed at multiple smart home devices; characterized in, the control command carries a count-down time duration for command execution time; continuing to broadcast the control command by a smart home device which receives the control command within its wireless broadcast coverage area, and carrying in the broadcasted control command the processing time for the smart home device to process the control command; determining command execution time by respective smart home devices to execute the control command according to the count-down time duration in the received control command, as well as the total processing time of respective smart home devices which the control command passes on its transmission path. The present disclosure enables respective devices in smart home system to achieve synchronization control, greatly improving user experience.

9 Claims, 3 Drawing Sheets

SYNCHRONIZATION CONTROL METHOD WITHIN WIRELESS NETWORK, WIRELESS NETWORK AND SMART HOME DEVICE

RELATED APPLICATIONS

This application is a continuation of U.S. patent application Ser. No. 15/089,076, filed on Apr. 4 2016, which application is incorporated by reference herein in its entirety.

TECHNICAL FIELD

The present disclosure generally relates to the smart home field, and particularly relates to synchronization control of nodes within smart home network.

TECHNICAL BACKGROUND

Along with the fast development of the mobile smart terminals, home devices are also becoming smarter. Smart home system, with residence as its platform, utilizes generic cabling technology, network communication technology, security technology, automatic control technology and audio-video technology to integrate home life-related facilities, construct high-efficiency residential facilities and management system for family matters, improve home safety, convenience, comfort and artistry, and achieve an environmental friendly and energy-saving living environment.

At present, the smart home devices within the smart home system are controlled by a central controller (or home gateway), i.e., by controlling the central controller with a control terminal, the central controller controls the smart home devices by executing commands from the control terminal. Such a control mode relies heavily on the central controller, and both remote control and short-distance control are carried out through gateway, accompanied by bad latency and user experience. The inventor of the present invention finds out that, although through wireless Mesh network, each network node, through other adjacent network nodes, can connect with each other by wireless multi-hop, when multiple smart home devices needs to work synchronously, complete synchronization is usually hard to achieve. Especially when Mesh network is relatively large, and has many nodes, the synchronization control of multiple nodes cannot be guaranteed.

SUMMARY

Objects of the present disclosure are to provide a synchronization control method within wireless network, a wireless network and a smart home device, enabling respective devices within the smart home system to achieve synchronization control, greatly improving user experience.

In order to solve above the technical problems, in the present disclosure, there is provided a synchronization control method within smart wireless network, comprising the following steps:
controlling a terminal to broadcast a control command directed at multiple smart home devices; wherein, the control command carries a count-down time duration for command execution time;
continuing to broadcast the control command by a smart home device which receives the control command within its wireless broadcast coverage area, and carrying in the broadcasted control command the processing time for the smart home device to process the control command;
determining command execution time by respective smart home devices to execute the control command according to the count-down time duration in the received control command, as well as the total processing time of respective smart home devices which the control command passes on its transmission path.

The present disclosure also provides a wireless network, comprising at least one control terminal and N smart home devices, wherein N is an integer greater than 1, the smart home devices comprising:
a receiving module, configured for receiving a control command directed at multiple smart home devices; wherein, the control command carries a count-down time duration for command execution time;
a forwarding module, configured for continuing to broadcast the control command received by the receiving module within the smart home device's wireless broadcast coverage area; wherein the broadcasted control command carries processing time for the smart home device to process the control command as well as a total processing time of the modules which forwarded the control command previously;
a determining module, configured for determining whether the smart home device needs to execute the control command received by the receiving module;
a command execution module, configured for, when the determining module determines that control command is to be executed, determining the command execution time according to the count-down time duration in the received control command, as well as the total processing time of respective smart home devices which the control command passes on its transmission path.

The present disclosure also provides a smart home device, comprising:
a receiving module, configured for receiving control command directed at multiple smart home devices; wherein, the control command carries a count-down time duration for command execution time;
a forwarding module, configured for continuing to broadcast the control command received by the receiving module within the smart home device's wireless broadcast coverage area; wherein the broadcasted control command carries the processing time for the smart home device to process the control command as well as a sum of processing time by the modules which forwarded the control command previously;
a determining module, configured for determining whether the smart home device needs to execute the control command received by the receiving module;
a command execution module, configured for, when the determining module determines that control command is to be executed, determining command execution time according to the count-down time duration in the received control command, as well as the total processing time of respective smart home devices which the control command passes on its transmission path.

Compared to prior art, the present disclosure provides smart home system control method which can achieve synchronization within smart home system wireless network, and greatly improve user experience. Because the control command carries the processing time which respective smart home device used for processing the control command during the command transmission process, a smart home device to execute the control command can determine command execution time according to the command processing time of respective smart home devices during the forwarding process, thus achieving synchronous operation of smart home system.

In addition, the synchronous control method within wireless network, comprising adding a total processing time field in the control command in advance; updating historical processing time to a sum of the historical processing time and the processing time for the smart home device to process the control command; subtracting historical processing time from the count-down time duration, to acquire updated count-down time duration; using the updated count-down time duration as the count-down time duration of command execution time for the smart home device. Thus respective smart home devices to execute control command can obtain its own accurate command execution time, achieving synchronization execution of control command.

In addition, the synchronous control method within wireless network comprising, the control command carrying a forwarding value representing the forwarding times of the control command; acquiring, by the smart home device to process the control command, the total forwarding time for the control command according to the forwarding value in the control command received, subtracting the total forwarding time from the updated count-down time duration, to acquire modified count-down time duration, and using modified count-down time duration as the count-down time duration of the command execution time for the smart home device. Thus respective smart home devices to execute control command can obtain more accurate command execution time, achieving synchronization execution of control command and improving user experience.

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the respective exemplary embodiments described herein may be combined with each other, unless specifically noted otherwise.

Figure 1:
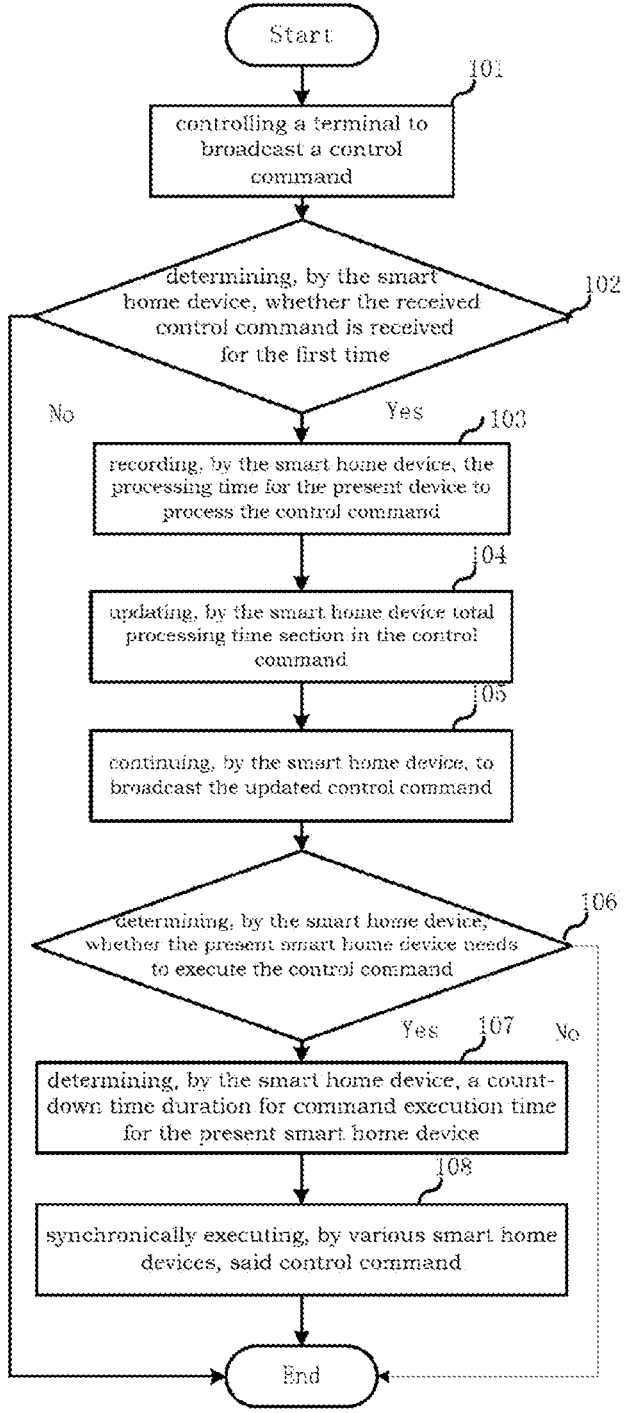
FIG. 1 is a flow diagram of a synchronization control method within wireless network according to the first embodiment of the present disclosure.

The first embodiment of the present disclosure relates to a synchronization control method within wireless network. Specific process is illustrated in FIG. 1.

Step 101: controlling a terminal to broadcast a control command, for example, broadcast a control command directed at multiple smart home devices. In the present embodiment, total processing time field (APT field) is added in the control command in advance for recording total control command processing time of respective smart home devices on the transmission path. When the control terminal broadcasts the control command, the APT field has an initial value 0. The length of the total processing time field is 1 byte.

In other words, in step 101, the control command broadcasted for controlling the terminal not only needs to a carry count-down time duration of command execution time and an identifier of a target smart home device (i.e., the identifier of the smart home device to execute the control command, e.g., a group id), but also needs to carry total processing time field (APT field).

Step 102: determining, by the smart home device, whether the received control command is receiver for the first time. When a terminal is controlled to start broadcasting the control command, respective smart home devices on the control command transmission path will constantly forward the control command within their own coverage, therefore certain smart device may receive the same control command for more than once. If the control command is received for the first time, then execute Step 103; if not, then the control command has been processed on the present smart home device, no need for repetition, thus the processing process of the control command can be ended directly.

Step 103: acquiring by the smart home device processing time for the present device to process the control command. To be more specific, assuming the time for receiving the control command is t0, the time for forwarding the control command is t1, then the difference between t0 and t1 is used as the processing time.

Step 104: updating by the smart home device total processing time field in the control command. Because the processing time the smart home device used for processing the control command has been acquired in Step 103, in Step 104, the processing time is updated to APT field in the control command. In other words, historical processing time is updated to the sum of historical processing time and the processing time for the present smart home device to process the control command; wherein, historical processing time is a value within the total processing time field in the control command.

For example, for a smart home device $D_1$ which receives the control command firstly, because the control command has not been processed before, the historical processing time it extracted from APT field is 0; assuming the processing time for the present device acquired by $D_1$ in Step 103 is $T_1$, then the updated historical processing time should be $(0+T_1)$, the smart home device $D_1$ updates APT field in the control command to $T_1$ eventually.

Step 105: continuing, by the smart home device which receives the control command, to broadcast the control command within its own wireless broadcast coverage area, and carrying in the broadcasted control command the processing time for the present smart home device to process the control command.

In particular, after updating APT field in the control command, smart home device $D_1$ continues to broadcast the control command within its own wireless broadcast coverage area, and carries updated APT field in the broadcasted control command.

Combining with the example mentioned above, for a second smart home device $D_2$ which receives the control command secondly on the transmission path (i.e., the control command is transmitted to $D_2$ through $D_1$), $D_2$ should extract information in APT field as historical processing time. Because the control command has been processed once before, the extracted historical processing time should be the processing time of the smart home device $D_1$, i.e., $T_1$. Assuming the processing time for the present device $D_2$ acquired by $D_2$ is $T_2$, then the historical processing time updated by $D_2$ should be $(T_1+T_2)$, the smart home device $D_2$ should update total processing time field in the control command to $(T_1+T_2)$ eventually. Similarly, for a N-th smart home device DN which receives the control command at the N-th place on the transmission path, because the control command has been processed (N−1) times before, the extracted historical processing time should be the sum of processing time of the smart home devices $D_1$ to $D_{N-1}$, $(T_1+T_2+\ldots+T_{N-1})$. Assuming the processing time for the present device $D_N$ acquired by $D_N$ is $T_N$, then the historical processing time updated by $D_N$ should be $(T_1+T_2+\ldots+T_N)$, the smart home device $D_N$ should update APT field in the control command to $(T_1+T_2+\ldots+T_N)$ eventually.

Step 106: determining, by the smart home device receiving the control command, whether the present smart home device needs to execute the control command. Because the control command is directed at specific target smart home device for instructing it to operate, the control command carries an identifier for the target smart home device. In Step 106, the smart home devices receiving the control command on the control command transmission path should extract the identifier of the target smart home device from the control command and compare the identifier with its own identifier. When the result is a match, the present smart home device needs to execute the control command, continues to Step 107; if the result is not a match, the present smart home device needs not to execute the control command, and the processing process of the control command can be ended directly.

Step 107: determining command execution time by respective smart home device to execute control command according to a count-down time duration of the received control command, as well as the total processing time of respective smart home devices which the control command passes on the transmission path.

Combining with the example mentioned above, assuming the count-down time duration of the control command received by a smart home device is T, the sum of the processing time of N smart home devices that the control command passes on transmission path is $(T_1+T_2+\ldots+T_N)$, then updated count-down time duration is $(T-(T_1+T_2+\ldots+T_N))$, i.e., the count-down time duration for command execution time for $D_1$ is $(T-T_1)$, and the count-down time duration for command execution time for $D_2$ $(T-(T_1+T_2))$.

Step 108: synchronically executing the control command by respective smart home devices to execute control command at the end of the count-down according to the determined count-down time duration for the present smart home device, so as to achieve the implementation effect of synchronically executing control command.

In the present embodiment, by considering the processing time of respective smart home devices which the control command passes on its transmission path, respective smart home devices to execute control command can acquire accurate command execution time, so as to achieve synchronization execution of the control command.

The second embodiment of the present disclosure relates to a synchronization control method within wireless network. The second embodiment is further improved on the basis of first embodiment. The major improvement is: in the second embodiment of the present disclosure, the control command also carries a forwarding value representing how many time the control command has been forwarded. Respective smart home devices to execute control command acquire total forwarding time for control command forwarding based on the forwarding value in the received control command, subtract the total forwarding time from the updated count-down time duration, acquire a modified count-down time duration as the count-down time duration of command execution time for the present smart home device.

Figure 2:
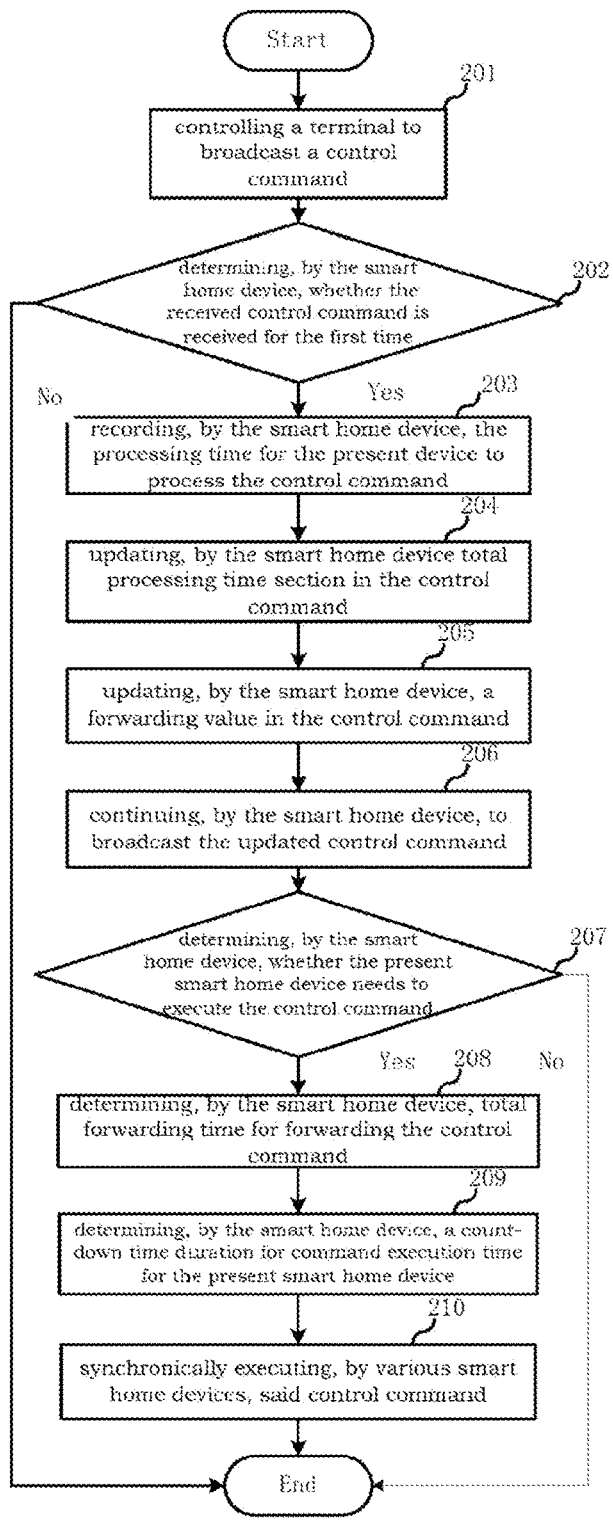
FIG. 2 is a flow diagram of a synchronization control method within wireless network according to the second embodiment of the present disclosure.

In particular, as shown in FIG. 2. Step 201 to Step 204 is the same as Step 101 to Step 104, and it won't be repeated.

Step 205: updating by the smart home device receiving the forwarding value representing how many times the control command has been forwarded in the control command. In specific implementation, HOP field or TTL field in the control command can be used to record forwarding times of the control command.

In particular, for example, where HOP field is used to record forwarding times of the control command, when a terminal is controlled to start broadcasting a control command; an initial value of the forwarding value representing forwarding times of the control command in the control command is 0. The smart home device $D_1$, which receives the control command firstly on the transmission path, should add 1 to the initial value and update the forwarding value to 1; the second smart home device $D_2$, which receives the control command secondly on the transmission path, receives the forwarding value 1, $D_2$ should add 1 and update the forwarding value to 2; the rest may be inferred, the N-th smart home device $D_N$, which receives the control command on the transmission path at the N-th place, receives the forwarding value (N−1), $D_N$ should add 1 and update the forwarding value to N.

Step 206: continuing, by the smart home device receiving the control command, to broadcast the control command within its own wireless broadcast coverage area, and carrying in the broadcasted control command the processing time for the present smart home device to process the control command as well as the forwarding value representing how many times the control command has been forwarded.

In particular, after updating APT field and HOP field (or TTL field) in the control command, the smart home device D1 continues to broadcast the control command within its own wireless broadcast coverage area.

Step 207: determining, by the smart home device receiving the control command whether the present smart home device needs to execute the control command. Step 207 is the same as Step 106, and it won't be repeated.

Step 208: determining, by respective smart home devices to execute the control command, total forwarding time for forwarding the control command.

The estimation method of total forwarding time is mainly to consider time required for receiving and sending the control command. In particular, assuming the package length of the control command is len, transmission rate is R, then time required to forward the control command once is temp+len/R; if the control command has been forwarded for N times, then total forwarding time is N*temp. In an implementation, a fixed time duration may be added for calibration, so as to consider other expenses in the wireless receiving and sending process.

Step 209: determining command execution time, by respective smart home devices to execute the control command, according to the count-down time duration in the received control command, the total processing time of respective smart home devices which the control command passes on the transmission path, as well as total forwarding time for forwarding the control command.

Combining with the example mentioned above, assuming the count-down time duration in the control command received by a smart home device is T, the sum of processing time of N smart home devices that the control command passes on transmission path is $(T_1+T_2+ \ldots +T_N)$, the total forwarding time for the N-th smart home device receiving the control command is N*temp, then the modified count-down time duration is $(T-(T_1+T_2+ \ldots +T_N)-N*temp)$, which is the count-down time duration for the present smart device to execute command.

Step 210: synchronically executing the control command, by respective smart home devices to execute the control command, at the end of the count-down according to the determined count-down time duration for the present smart home device, so as to achieve the implementation effect of synchronically executing the control command.

In the present embodiment, both the processing time and total forwarding time of respective smart home devices which the control command passes on the transmission path are taken into consideration, thus respective smart home devices to execute the control command can obtain more accurate command execution time, achieving synchronization execution of the control command and improving user experience.

The above mentioned steps are for clear description, when implementing, those steps may be combined into one step, and some steps may also be separated into multiple steps, as long as they comprise the same logical relation, they are all within the scope of the present disclosure; adding insignificant modifications or introducing of insignificant designs to algorism or procedure, without changing the core design of the algorism and procedure, still falls within the scope of the present disclosure.

Figure 3:
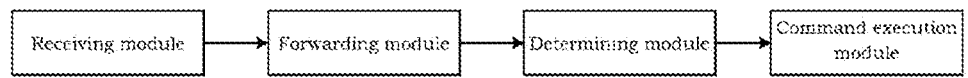
FIG. 3 is a structural diagram of a smart home device within wireless network according to the third embodiment of the present disclosure.

The third embodiment of the present disclosure relates to a wireless network, comprising at least one control terminal and N smart home devices, wherein N is an integer greater than 1, as shown in FIG. 3, the smart home devices comprising:

a receiving module, configured for receiving a control command directed at multiple smart home devices; wherein, the control command carries a count-down time duration for command execution time;

a forwarding module, configured for continuing to broadcast the control command received by the receiving module within the smart home device's wireless broadcast coverage area; characterized in, the broadcasted control command carries processing time for the smart home device to process the control command as well as a total processing time of the modules which forwarded the control command previously;

a determining module, configured for determining whether the smart home device needs to execute the control command received by the receiving module;

a command execution module, configured for, when the determining module determines that control command is to be executed, determining the command execution time according to the count-down time duration in the received control command, as well as the total processing time of respective smart home devices which the control command passes on its transmission path.

In an embodiment of the present disclosure, the forwarding module further comprises:

a historical processing time acquiring sub-module, configured for acquiring historical processing time of the control command, wherein, the historical processing time is a value within the total processing time field in the control command;

an updating sub-module, configured for updating historical processing time to a sum of the historical processing time and the processing time for present smart home device to process the control command, and carrying the updated historical processing time within the total processing time field;

the command execution module comprises:

a count-down time duration update sub-module, configured for subtracting the historical processing time from the count-down time duration, to acquire an updated count-down time duration;

an execution time determination sub-module, configured for using the updated count-down time duration as the count-down time duration of command execution time for the smart home device.

It is not difficult to see, that the present embodiment is a systematic embodiment corresponding the first embodiment. The present embodiment can cooperate with the first embodiment in implementation. The related technical details mentioned in the first embodiment remains effective in the present embodiment, thus omitted to avoid repetition. Correspondingly, the related technical details mentioned in the present embodiment can also be applied in the first embodiment.

It is worth mentioning that the modules referred to by the present embodiment are all logic modules. In practical application, a logic module can be a physical unit, a part of a physical unit, or the combination of multiple physical units. In addition, in order to emphasize the innovational part of the present disclosure, the present embodiment has not introduced unit with less relation to the solution of the technical problems raised, but this does not mean that the present embodiment does not have other units.

The fourth embodiment of the present disclosure relates to a wireless network, comprising at least one control terminal and N smart home devices, wherein N is an integer greater than 1. The fourth embodiment is further improved on the basis of third embodiment. The major improvement is: in the fourth embodiment of the present disclosure, the control command also carries a forwarding value representing how many times it has been forwarded.

The command execution module further comprises:

a total forwarding time acquiring sub-module, configured for acquiring total forwarding time for forwarding the control command according to a forwarding value in the control command received;

a modification sub-module, configured for subtracting the total forwarding time from the updated count-down time duration, and acquiring a modified count-down time duration;

the execution time determination sub-module, further configured for using the modified count-down time duration as the count-down time duration of command execution time for the smart home device.

Because the second embodiment corresponds with the present embodiment, the present embodiment can cooperate with the second embodiment in implementation. The related technical details mentioned in the second embodiment remains effective in the present embodiment, the technical effect achieved in the second embodiment can also be achieved here, thus omitted to avoid repetition. Correspondingly, the related technical details mentioned in the present embodiment can also be applied in the second embodiment.

The fifth embodiment of the present disclosure relates to a smart home device, comprising:

a receiving module, configured for receiving control command directed at multiple smart home devices; wherein, the control command carries a count-down time duration for command execution time;

a forwarding module, configured for continuing to broadcast the control command received by the receiving module within the smart home device's wireless broadcast coverage area; wherein, the broadcasted control command carries the processing time for the smart home device to process the control command as well as a sum of processing time by the modules which forwarded the control command previously;
a determining module, configured for determining whether the smart home device needs to execute the control command received by the receiving module;
a command execution module, configured for, when the determining module determines that control command is to be executed, determining command execution time according to the count-down time duration in the received control command, as well as the total processing time of respective smart home devices which the control command passes on its transmission path.

It will be apparent to those of ordinary skill in the art that in real application, embodiments that depart from these specific forms and details would still be understood to be within the spirit and scope of the present disclosure.

The invention claimed is:

1. A synchronization control method in a wireless network, comprising: controlling a terminal to broadcast a control command directed at multiple smart home devices, wherein the control command carries a count-down time duration for command execution time; continuing to broadcast the control command by a smart home device which receives the control command within wireless broadcast coverage area of the smart home device, and carrying in the broadcasted control command the processing time for the smart home device to process the control command; determining command execution time by respective smart home devices required to execute the control command according to the count-down time duration in the received control command, as well as the total processing time of respective smart home devices which the control command passes on its transmission path.

2. The synchronization control method in a wireless network according to claim 1, wherein a total processing time field is added in the control command in advance, and wherein the step of carrying in the broadcasted control command the processing time for the smart home device to process the control command comprises following sub-steps: updating historical processing time to a sum of the historical processing time and the processing time for the smart home device to process the control command, wherein the historical processing time is a value within the total processing time field in the received control command; the step of determining command execution time by respective smart home devices comprising following sub-steps: subtracting the historical processing time from the count-down time duration, to acquire updated count-down time duration; using the updated count-down time duration as the count-down time duration of command execution time for the smart home device.

3. The synchronization control method in a wireless network according to claim 2, wherein the control command further carries a forwarding value representing the forwarding times of the control command; after the step of acquiring the updated count-down time duration, and before the step of using the updated count-down time duration as the count-down time duration of command execution time for the smart home device, the method further comprising: acquiring total forwarding time for the control command according to the forwarding value in the control command received; subtracting the total forwarding time from the updated count-down time duration, to acquire modified count-down time duration; in the step of using the updated count-down time duration as the count-down time duration of command execution time for the smart home device, using the modified count-down time duration as the count-down time duration of the command execution time for the smart home device.

4. The synchronization control method in a wireless network according to claim 2, wherein the step of acquiring total forwarding time for the control command according to the forwarding value in the control command received comprises following sub-steps: calculating a duration required to forward the control command once according to package length and transmission rate of the control command; using a product of the duration required to forward the control command once and the forwarding value of the control command as the total forwarding time.

5. The synchronization control method in a wireless network according to claim 1, wherein the smart home device acquires processing time for processing control command in a following way: recording time t0 for receiving the control command and time t1 for forwarding the control command; using the difference between t0 and t1 as the processing time.

6. A wireless network, comprising at least one control terminal and N smart home devices, N being an integer greater than 1, wherein the smart home device comprises:
a processor; and
a memory for storing instructions executable by the processor;
wherein the processor is configured to:
receive a control command directed at multiple smart home devices, wherein the control command carries a count-down time duration for command execution time;
broadcast the control command received by the smart home device within a wireless broadcast coverage area of the smart home device, wherein the broadcasted control command carries processing time for the smart home device to process the control command as well as a total processing time for forwarding the control command previously;
determine whether the smart home device needs to execute the control command received by the smart home device;
when it is determined that the control command is to be executed, determine the command execution time according to the count-down time duration in the received control command, as well as the total processing time of respective smart home devices which the control command passes on its transmission path.

7. The wireless network according to claim 6, wherein the processor is further configured to carry the processing time in total processing time field added in the control command; acquire historical processing time of the control command, wherein the historical processing time is a value within the total processing time field in the control command received; update historical processing time to a sum of the historical processing time and the processing time for the smart home device to process the control command, and carry the updated historical processing time in the total processing time field; subtract the historical processing time from the count-down time duration, to acquire an updated count-down time duration; use the updated count-down time duration as the count-down time duration of command execution time for the smart home device.

8. The wireless network according to claim 7, wherein the control command further carries a forwarding value representing how many times the control command has been forwarded, and wherein the processor is further configured to: acquire total forwarding time for forwarding the control command according to a forwarding value in the control command received; subtract the total forwarding time from the updated count-down time duration to acquire a modified count-down time duration; use the modified count-down time duration as the count-down time duration of command execution time for the smart home device.

9. A smart home device, comprising:
a processor; and
a memory for storing instructions executable by the processor;
wherein the processor is configured to:
receive a control command directed at multiple smart home devices, wherein the control command carries a count-down time duration for command execution time; continue to broadcast the control command received by the smart home device within wireless broadcast coverage area of the smart home device, wherein the broadcasted control command carries the processing time for the smart home device to process the control command as well as a sum of processing time for forwarding the control command previously; determine whether the smart home device needs to execute the control command received by the smart home device; when it is determined that the control command is to be executed, determining command execution time according to the count-down time duration in the received control command, as well as the total processing time of respective smart home devices which the control command passes on its transmission path.

* * * * *